United States Patent
Doyle

(10) Patent No.: US 7,058,274 B2
(45) Date of Patent: Jun. 6, 2006

(54) ADJUSTABLE AND MODULAR BACKPLANE ASSEMBLY FOR PROVIDING A FIBER-OPTICS COMMUNICATION BACKPLANE

(75) Inventor: Peter John Doyle, Los Altos, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 10/861,742

(22) Filed: Jun. 3, 2004

(65) Prior Publication Data

US 2004/0218374 A1 Nov. 4, 2004

Related U.S. Application Data

(63) Continuation of application No. 10/386,883, filed on Mar. 11, 2003, now Pat. No. 6,761,487.

(51) Int. Cl.
*G02B 6/00* (2006.01)
*G02B 6/36* (2006.01)
*H01R 12/16* (2006.01)
*H04J 14/00* (2006.01)

(52) U.S. Cl. .................. 385/134; 385/92; 361/788; 398/49

(58) Field of Classification Search .............. 385/53, 385/54, 56, 59, 70, 72, 88, 89, 114, 139, 14, 385/92, 94, 134, 135; 361/788–790, 796; 398/49, 50
See application file for complete search history.

(56) References Cited

U.S. PATENT DOCUMENTS

| | | | | |
|---|---|---|---|---|
| 5,724,468 A | * | 3/1998 | Leone et al. ............... | 385/134 |
| 5,748,451 A | * | 5/1998 | Thompson et al. ......... | 361/788 |
| 5,883,998 A | * | 3/1999 | Stevens et al. ............. | 385/134 |
| 5,980,312 A | * | 11/1999 | Chapman et al. ......... | 439/540.1 |
| 6,388,891 B1 | * | 5/2002 | Falkenberg et al. ........ | 361/796 |
| 6,461,053 B1 | * | 10/2002 | Mayercik et al. .......... | 385/56 |
| 6,533,463 B1 | | 3/2003 | Doyle | |
| 6,761,487 B1 | | 7/2004 | Doyle | |
| 6,932,514 B1 | * | 8/2005 | Anderson et al. ........... | 385/59 |
| 2002/0106161 A1 | * | 8/2002 | Kiani ..................... | 385/53 |
| 2003/0103752 A1 | * | 6/2003 | Paradiso et al. ........... | 385/134 |

* cited by examiner

Primary Examiner—Scott J. Sugarman
Assistant Examiner—M. Hasan
(74) Attorney, Agent, or Firm—Donald R. Boys; Central Coast Patent Agency, Inc.

(57) ABSTRACT

A modular and adjustable backplane assembly for providing a fiber-optics backplane interface to a plurality of router cards functioning as a data router is provided. The assembly includes a first portion having a first array of connectors for interfacing with a compatible array of second connectors engaging specific ones of the router cards, and a second portion having a second array of connectors for interfacing with a compatible array of second connectors engaging specific others of the router cards. The mechanics of the assembly enable a moveable attachment with respect to the first and second portions such that they may be positionally adjusted during mounting, and wherein external data paths are provided from individual ones of the connectors to individual others of the connectors by fiber-optic conductors.

32 Claims, 3 Drawing Sheets

(Optical Backplane Assy.)    (Optical Backplane Assy.)

ADJUSTABLE AND MODULAR BACKPLANE ASSEMBLY FOR PROVIDING A FIBER-OPTICS COMMUNICATION BACKPLANE

This application is a continuation of Ser. No. 10/386,883 Mar. 11, 2003 U.S. Pat. No. 6,761,487

FIELD OF THE INVENTION

The present invention is in the field of backplane communication and pertains more particularly to a fiber-optics backplane for a scalable router.

BACKGROUND OF THE INVENTION

In the general state of the art of electrical and electronic systems housed in cabinets (often termed chassis), there are typically inputs and outputs to the system, facilitated by connection of communication links of various sorts, over which signals are received and sent. There are also numerous situations wherein groups of components in a chassis have to be connected to and communicate with other groups of components internally. Data routers in packet networks, such as the well-known Internet, are a good example. In description in this specification a data router is used as a specific example of such a situation, and the present invention in several aspects is applicable to such routers.

Transmission of network data traffic is accomplished with the use of data routers as introduced above. A physical data routing machine typically consists of a processing unit or multiple units which are housed in a chassis and which communicate with each other and with other data routing machines.

In prior art, one method for achieving communication between processing units in a single chassis, such as in a data router, involves the use of an electrical backplane. When communication between multiple chassis is required, the electrical backplanes of the chassis have been connected by cables. The electrical backplane is commonly implemented as a printed circuit board assembly which provides electrical connectivity between processing units.

Noting that it may sometimes be desirable to communicate at backplane level between elements that are not closely physically associated, such as between elements that may be mounted in separate physical electronic cabinets, there is a potential problem with electrical backplanes. When an electrical signal is transmitted over relatively long distances, for example, deterioration of the signal may occur for any of several reasons. For example, longer signal paths necessarily present additional resistance. Also, longer paths present additional opportunity for interference. Therefore, in order to transmit clean signals in systems utilizing electrical backplanes the elements in communication must be in relatively close physical proximity to one another, such as in the same cabinet.

Another drawback to electrical backplane boards is that they are relatively difficult to service. One reason is that the conductors for the electrical signals are typically patterned on the board, and individual conductors (signal paths) cannot be separately serviced. In many cases the backplane boards are also hardwired to other components. Because any change or repair is normally via a replacement of the entire backplane, the system containing the electrical backplane is generally out of service during any backplane service.

What is clearly needed is an apparatus and method enabling cleaner data signal transmission between router processing units while at the same time facilitating easier manufacturing and off-line servicing of backplane assemblies.

SUMMARY OF THE INVENTION

In a preferred embodiment of the present invention a modular and adjustable backplane assembly to provide backplane communication between a first signal interface to a first set of components in a cabinet and a second signal interface to second set of components in the same cabinet is provided, comprising a first portion mounting a third signal interface configured to engage the first signal interface, a second portion mounting a fourth signal interface configured to engage the second signal interface, an adjustment mechanism allowing relative movement between the first and second portions, thereby between the third and fourth signal interfaces, while preserving the modularity of the backplane assembly, and a signal conductor assembly engaging the third and fourth signal interfaces to communicate signals between the first set of components and the second set of components.

In a preferred embodiment the cabinet houses elements of a packet router, and the first and second sets of components are router cards. In some embodiments the first and second signal interfaces are groups of connectors for connecting signal conductors to individual ones of the cards in the first and second sets of router cards. Further, the first and second signal interfaces may be first and second connectors to printed circuit boards (PCBs) that are in turn connected to the first and second set of components.

In some cases the third and fourth signal interfaces comprise fiber-optic connectors, and the signal conductor assembly comprises one or more fiber-optic fibers having end-connectors for engaging the fiber-optic connectors. The fibers may comprise one or more bundles, ribbons or cables.

In some cases the third and fourth signal interfaces comprise electrical connectors, and the signal conductor assembly comprises one or more cables of electrical conductors having end connectors to engage the electrical connectors. Also in some cases the signal conductor assembly comprises a cable of electrical conductors having end-connectors to engage the electrical connectors at the PCBs.

In some embodiments of the backplane assembly the adjustment mechanism comprises telescopic engagement elements allowing adjustment of separation between the first and second portions. The re may further be a locking mechanism for securing the telescoping first and second portions after adjustment to engage the first and second interfaces.

In other embodiments the adjustment mechanism further comprises first locating elements in the immediate area of each of the first and second signal interfaces, and compatible locating elements in the immediate area of the third and fourth signal interfaces, to physically locate the first and second portions in assembly to the cabinet to engage the first and third and the second and fourth signal interfaces. The locating elements may comprise male and female elements for constraining engagement position.

In another aspect of the invention a method for connecting a first signal interface connected to a first set of components and a second signal interface connected to a second set of components in a cabinet, comprising the steps of (a) preparing a modular and adjustable backplane assembly comprising a first portion mounting a third signal interface configured to engage the first signal interface, a second portion mounting a fourth signal interface configured to engage the second signal interface, an adjustment mechanism allowing relative movement between the first and second portions, thereby between the third and fourth signal interfaces, while preserving the modularity of the backplane assembly, and a signal conductor assembly engaging the third and fourth signal interfaces to communicate signals between the first set of components and the second set of components; and (b) assembling the modular backplane assembly to the cabinet, with the third signal interface engaging the first, and the fourth signal interface engaging the second, the adjustment mechanism allowing the third and fourth signal interfaces to assume a proper separation distance to accomplish engagement of the signal interfaces.

In some embodiments the cabinet houses elements of a packet router, and the first and second sets of components are router cards. In these embodiments the first and second signal interfaces may be groups of connectors for connecting signal conductors to individual ones of the cards in the first and second sets of router cards. Also in some embodiments the first and second signal interfaces may be first and second connectors to printed circuit boards (PCBs) that are in turn connected to the first and second set of components. Further, in some embodiments the third and fourth signal interfaces comprise fiber-optic connectors, and the signal conductor assembly comprises one or more fiber-optic fibers having end-connectors for engaging the fiber-optic connectors. The fibers may comprise one or more bundles, ribbons or cables. In some cases the third and fourth signal interfaces comprise electrical connectors, and the signal conductor assembly comprises one or more cables of electrical conductors having end connectors to engage the electrical connectors. Also in some cases the signal conductor assembly comprises a cable of electrical conductors having end-connectors to engage the electrical connectors at the PCBs.

In some embodiments the adjustment mechanism comprises telescopic engagement elements allowing adjustment of separation between the first and second portions, and there may further be a locking mechanism for securing the telescoping first and second portions after adjustment to engage the first and second interfaces. In addition there may be first locating elements in the immediate area of each of the first and second signal interfaces, and compatible locating elements in the immediate area of the third and fourth signal interfaces, to physically locate the first and second portions in assembly to the cabinet to engage the first and third and the second and fourth signal interfaces. The locating elements may comprise male and female elements for constraining engagement position.

In another aspect there may be a fifth signal interface connected to one or both of the third and fourth signal interfaces, the fifth signal interface placed on the backplane assembly to be accessible with the backplane assembly mounted to the cabinet, to facilitate connection of the backplane assembly to a second backplane assembly having a fifth signal interface and assembled to a second cabinet, thereby providing signal communication between components in the first cabinet and the second cabinet. The fifth signal interface may be a connector for connecting one or more signal conductors, and may comprise a fiber-optic connector compatible with a mating connector for one or more fiber-optic fibers between the backplane assemblies. The fiber-optic fibers can be in one or more ribbons or cables.

In yet another embodiment the fifth signal interface is an electrical connector compatible with a mating connector of an electrical cable between the backplane assemblies.

In embodiments of the invention taught in enabling detail below, for the first time an adjustable cabinet backplane is provided to the art, in which regions of the backplane may be positioned in assembly according to the positions of elements of the cabinet to which the backplane is to be assembled. Also for the first time an ability to interconnect elements in each cabinet at the backplane level is provided.

BRIEF DESCRIPTION OF THE DRAWING FIGURES

DESCRIPTION OF THE PREFERRED EMBODIMENTS

Figure 1:
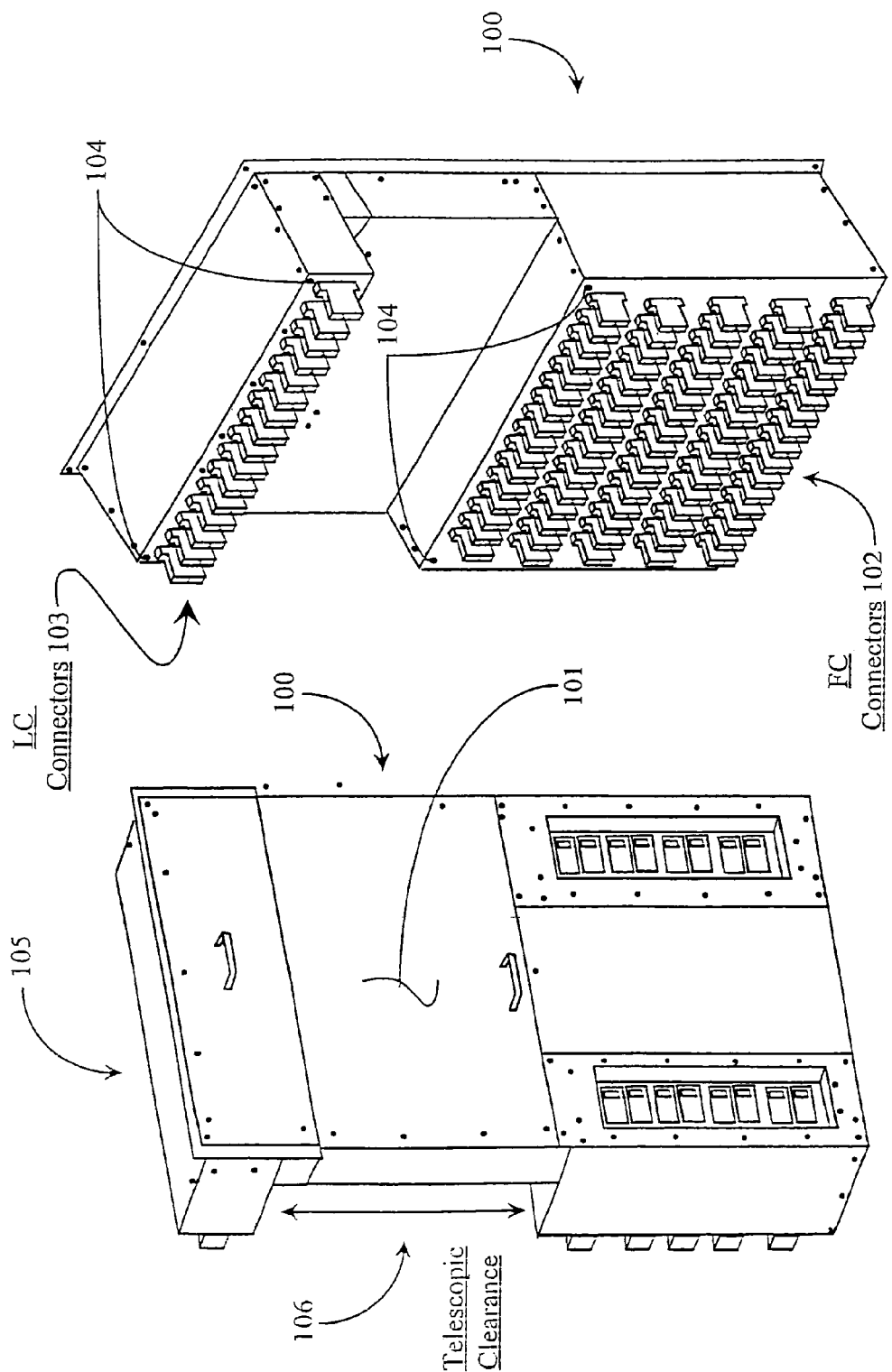
FIG. 1a is a perspective view of a backplane assembly according to an embodiment of the present invention as seen from a first vantage point.
FIG. 1b is a perspective view of a backplane assembly according to an embodiment of the present invention as seen from a second vantage point.

FIGS. 1a and 1b are perspective views of a backplane assembly 100 according to an embodiment of the present invention as seen from two separate vantage points. Backplane assembly 100 comprises separate top and bottom components or portions represented herein as components 105 and 106 that can be assembled together and whose clearance tolerance from each other can be adjusted via a telescopic or slidable method. Telescopic clearance is illustrated in this example by a bi-directional arrow labeled Telescopic Clearance. Both components 105 and 106 making up backplane 100 are, together, mounted to a back panel illustrated herein as back panel 101. Back panel 101 has plurality of openings provided therein and adapted for accepting fasteners as may be found in current art to secure the connection of backplane assembly or backplane 100 to a router chassis.

Referring now to FIG. 1b, backplane 100 has a plurality of openings provided therein and adapted to house a plurality of fabric card (FC) connectors 102. These connectors comprise a communication signal interface to a set of fabric cards. Connectors 102 are contained in portion 106 of backplane assembly 100. Connectors 102 are, in this particular embodiment plastic plug-in connectors arranged in a Cartesian array, which is designed to match the positions of fabric card terminals of fabric cards housed in a card cage in a data router chassis (not illustrated). Backplane 100 also has a plurality of line card (LC) fiber-optics connectors 103 provided therein, that comprise another signal interface, this time to line cards. Connectors 103 are arranged in the top portion of backplane assembly 100. Like fabric-card connectors 102, they are plastic plug-in connectors. Connectors 103 are arranged in a row matching the pattern of connectors on line cards installed in a main router chassis.

The structure for backplane assembly 100 (portions 105 and 106) may be manufactured from aluminum, sheet metal, or other durable material that may be formed and machined. Similarly, panel 101 may be manufactured from aluminum or other sheet metals.

In this example, backplane connections are implemented using fiber optics ferrules well-known in the art. In other embodiments of the invention the connectors on the signal interfaces can be for electrical signals. Connector housings 102 and 103 function to mechanically house either the female or alternatively, the male ferrule. Each ferrule presents optic strands or fibers, which are strategically aligned by the connection method so that data may be transmitted between the strands. In actual practice in a preferred embodiment, each connector housing (102, 103) contains 4 optics ferrules either male or female. Card terminals (not shown) within a router chassis contain 4 ferrules, which mate with the ferrules in connector housings 102 and 103. If the ferrules on the router card terminals are male, then the ferrules on the connector housings will be female.

Intercommunication between router cards then is facilitated by connectors 102 and 103 comprising an "optics backplane". Unlike a physical electrical backplane board of prior art, fiber strands comprising communication paths interconnect specific ferrules contained in the housings enabling cross communication among cards housed in the main router chassis. Similarly, ferrules provided in separate router chassis may be connected by fiber-optics, enabling a fabric card housed in one router chassis to communicate with a similar card housed in a separate router chassis essentially providing a scalable router. The implementation of fiber-optic communication as a backplane enables multiple router chassis integrated by backplane communication to form one router to be located much further apart than is practical with prior-art electrical back-planing methods.

In the example of FIG. 1, backplane assembly 100 has 4 alignment openings 104 provided therein and adapted to accept alignment pins or dowels (not shown) provided in a main router chassis. Alignment openings 104 are strategically located in four strategic locations on the backplane assembly 100, two on the top portion and two on the bottom portion. Openings 104 are somewhat larger in diameter than the corresponding diameter of alignment pins or dowels on a router chassis. The oversizing enables acceptance of the alignment pins of a router chassis without causing misalignment of connectors.

As was described above, backplane assembly 100 in this example consists of two portions 105 and 106 that are assembled together in a slidable fashion, providing an adjustment mechanism, enabling both vertical and some horizontal float. When back panel 101 is completely installed to backplane assembly 100, the slidable position with respect to portions 105 and 106 of the assembly is locked. The goal of telescopic capability as an adjustment mechanism is to enable alignment openings 104 to be conditionally tolerenced to fit over fixed alignment pins housed in any main router chassis. It is noted herein that the alignment pins in a router chassis are associated carefully to the true position of fabric and line card connectors presented for engaging connectors 102 and 103 respectively, such that when backplane 100 is adjusted for fit over the alignment pins, all of the optics connections are aligned for plug-in. The dimensional variance may change somewhat from chassis to chassis. Therefore, provision of an adjustable backplane assembly provides modularity.

Figure 2:
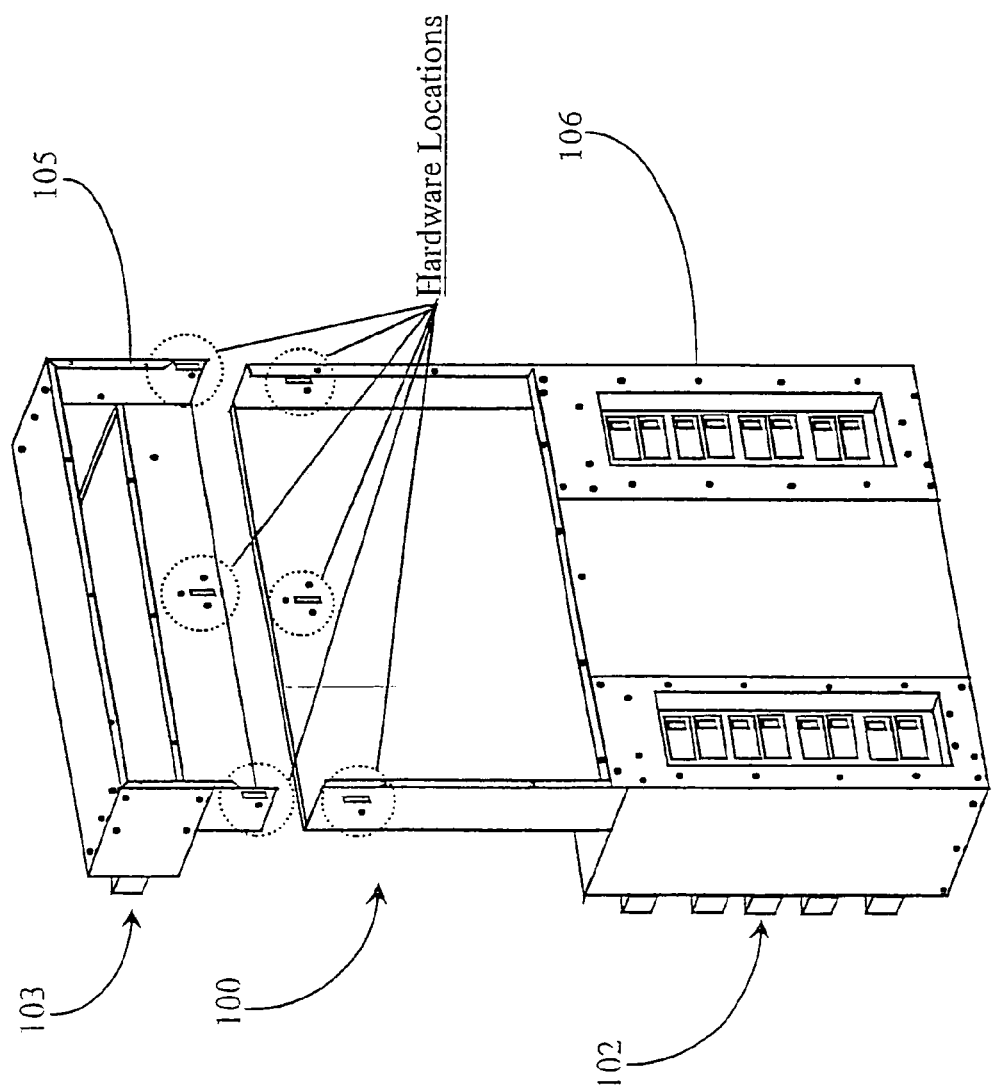
FIG. 2 is a perspective view of the backplane assembly of FIG. 1 shown disassembled.

FIG. 2 is a perspective view of the backplane assembly 100 of FIGS. 1a and b shown disassembled illustrating separate components 105 and 106.

This disassembled view illustrates the mechanism of the telescopic capability of backplane assembly 100. Component or upper portion 105 houses connectors 103 while component or lower portion 106 houses connectors 102. Backplane assembly 100 is illustrated in this example without back panel 101 of FIG. 1 in order to reveal alignment slots that enable telescopic adjustment. For example, lower portion 106 has 3 alignment slots provided therein and labeled "hardware locations". These alignment slots correspond to a matching array (3) of alignment slots provided in upper portion 105. Each alignment slot is elongated to provide the vertical float adjustment described with reference to FIG. 1 above. Upper portion 105 may be manufactured of such a width dimension so as to fit inside portion 106 or so as to fit over portion 106. The alignment slots are adapted to fit around a common fastening hardware such as bolts.

In one embodiment, metal inserts (not shown) may be used to provide an adjustment mechanism at the location of each alignment slot. Such inserts are loosened to allow float capability along the elongated slots until suitable match up of alignment openings 104 (FIG. 1) with matching alignment pins on a router chassis is achieved. With alignment accomplished, meaning that openings 104 are successfully mated with corresponding alignment pins provided in a main router chassis, the telescopic fasteners can be tightened securing the aligned positioning and backpanel 101 (FIG. 1) may then be installed.

Figure 3:
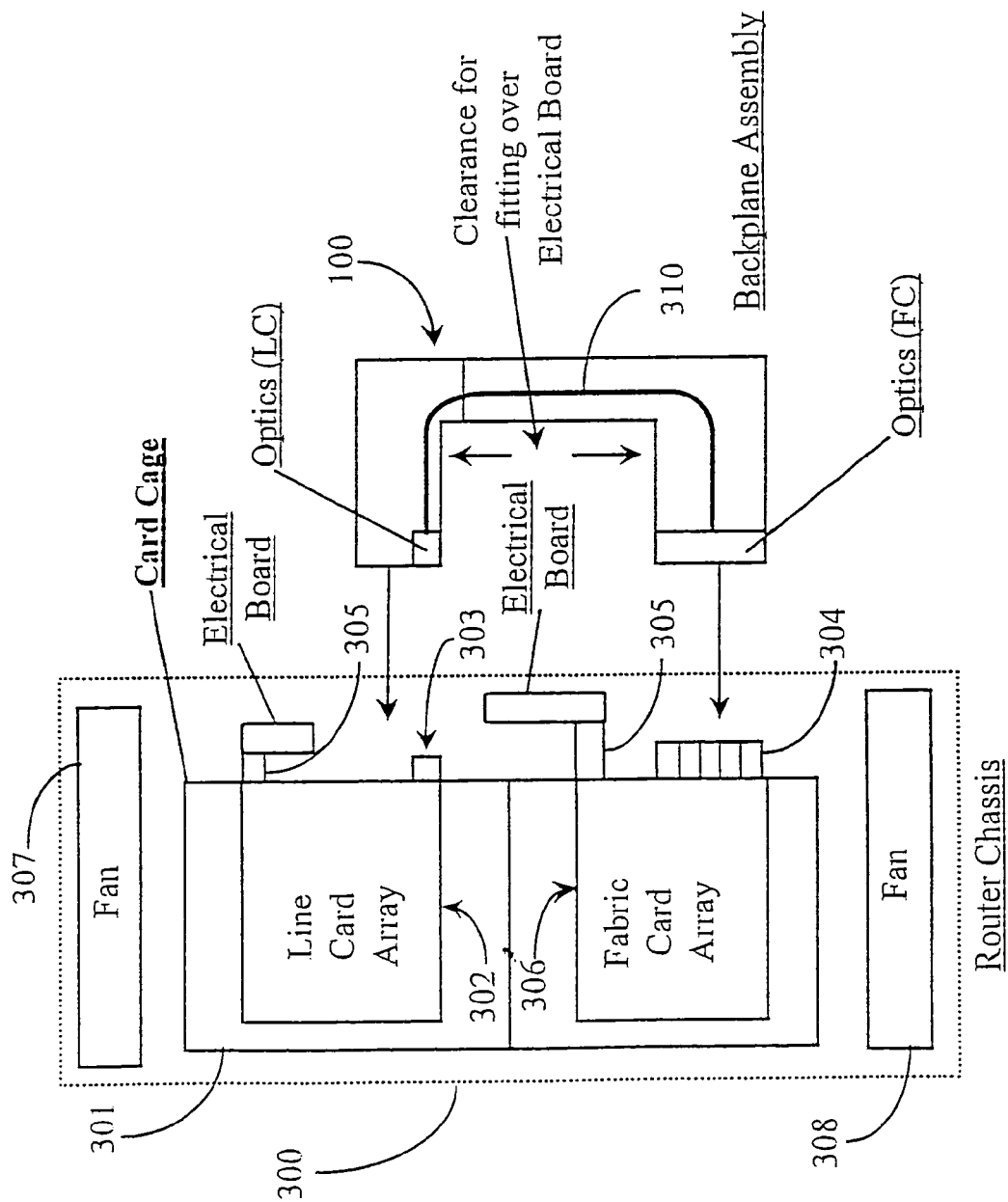
FIG. 3 is a block diagram illustrating the relationship between the backplane assembly of FIGS. 1 and 2 to a main router chassis according to an embodiment of the present invention.

FIG. 3 is a block diagram illustrating the relationship of backplane assembly 100 to a main router chassis 300 according to an embodiment of the present invention. Again, the adjustable backplane assembly in various embodiments may be for connection of elements in many sorts of cabinets and systems, of which packet routers are a single example.

Main router chassis 300 houses a card cage 301. Card cage 301 is adapted to support a line card array 302 and a fabric card array 306. It is noted herein that line cards 302 and fabric cards 306 of router chassis 300 are supported within cage 301 in a fashion similar to books being stacked along side each other at equal spacing from each other. Each card rests in a card slot (not illustrated). The card slots are provided equally spaced from one another, the cards adapted individually to fit snugly into a designated slot. It is also noted herein that a comparatively few control cards (not illustrated) are, in actual practice, included in line card array 302.

Exposed Fiber-optics connectors, illustrated herein as fiber-optics connectors 303 (for line cards) and fiber-optics connectors 304 (for fabric cards) are in true-position relationship with respect to one another when the cards are installed in their respective slots. Fiber-optics connectors 304 and 303 fit easily through provided openings machined into or provided in a separate piece like a grate that is mounted onto main router chassis 300. It is noted herein that the pattern of openings provided for fitting card terminals there through has all individual openings oversized with respect to inner dimensioning to accept the plastic connector housings in a slip-through fashion. However, the pattern of openings provided on backplane 100 comprise individual openings that are tightly-tolleranced. Each line card and fabric card has, in addition to fiber-optics connectors 304 and 303, connectors 305 to facilitate plug-in connection to conventional electrical backplane boards, labeled as such, which are installed in main chassis 300. It is noted herein that electrical backplanes are still used in this example for propagating error messaging and other such signals.

In various applications the backplane assembly may be implemented as an electrical backplane or as a fiber-optic backplane. However, fiber-optics is used in this example to transmit information related to data packets from card to card along with certain other message types. Fiber-optics FC and LC connectors provided on housing 100 are analogous to connectors 102 and 103 respectively of FIG. 1. In this example one or more fiber-optics cables, represented by element number 310, connect the upper and lower signal interfaces (the fiber-optic connectors 102 and 103, see FIGS. 1a and b). This cable or cables are provided with sufficient slack that the necessary adjustment can be made between the upper and lower portions of the backplane assembly. In the case of an electrical backplane this cable or cables comprise cables of electrical conductors.

In one embodiment, especially useful in an electrical backplane, separate PCBs may be mounted at the upper and lower signal interfaces, and cable connection 310 is accomplished between these PCBs. In this embodiment the connection PCBs may be considered a part of signal interfaces 102 and 103.

When backplane assembly 100 is in a loosened and vertically-adjustable mode, alignment openings 104 (FIG. 1) are placed over the alignment pins (not illustrated) of chassis 300. At this point line card connectors 103 (Optics (LC)) and fabric card connectors 102 (Optics (FC) are in proper alignment to be presented to line card connectors 303 and fabric card connectors 304 respectively. Housing 100 fits to chassis 300 generally in the direction of the illustrated directional arrows.

Backplane assembly 100 has a built-in vertical clearance area designed to allow enough room for the router's lower electrical board 305 when the optics backplane assembly 100 is installed to chassis 300. This area is illustrated herein by the arrows labeled Clearance for fitting over Electrical Board. Also shown are cooling fans housed in the top and bottom sections of the main router chassis 300. Cooling fans are for dispersing heat generated by processing.

Removal of a Backplane Assembly:

Referring now to FIG. 3, it is again noted herein that each fabric card (306) and line card (302) fits into card cage 301 as previously described with respect to the main router housing (300) so that the method of unplugging and disconnecting a card from a mounted backplane assembly is to simply pull the card out from its slot similar to removing a modular PC card from a PC slot. To remove the entire backplane assembly itself from the router chassis, all of the line cards and fabric cards are physically pulled from their connections to the optics backplane assembly and can remain aligned in their slots. Backpanel 101 (FIG. 1) is first removed exposing the aligned interface portion ("Hardware Locations", (FIG. 2) of backplane assembly 100. The fasteners connecting and tightening the alignment interfaces are removed and backplane assembly 100 may be removed from chassis 300.

In one embodiment the back panel does not have to be removed from the backplane module. In this embodiment strategic openings (not illustrated) are placed through the wall of the back panel that allow access to the tightening bolts around the alignment pins such that they may be removed with, perhaps, a specially designed tool. In still another embodiment, a portion of back panel 101 may be hinged such that the portion swings open exposing alignment interfaces.

Installing a Backplane Assembly:

Installation of a backplane assembly is essentially reversed from removal. Referring back to FIG. 2 the telescopic fasteners of the two-piece assembly are loosened to provide float capability for aligning the alignment pins to the alignment openings 104 of FIG. 1. Openings 104 are only slightly oversize from the alignment pins and not enough to cause miss-alignment of connectors as previously described. Once the alignment pins are engaged through openings 104 of assembly 100, then the alignment interfaces are tightened and back panel 101 may be reinstalled. At this point the line and fabric cards may be slid back into their slots and plugged in using suitable force.

In one embodiment backpanel 101 is first removed exposing the alignment interface portion of the backplane module. The connecting and alignment fasteners are then loosed and removed allowing the backplane module to be removed from the main router chassis.

It will be apparent to the skilled artisan that there are a variety of alterations that may be made to the embodiments described herein without departing from the spirit and scope of the invention. For example, in one embodiment, instead of optics ferrules, other known fiber-optics connection mechanisms may be utilized to effect backplane connections.

Providing an optics backplane that is modular and adjustable enables flexibility in maintenance in addition to improved signal transmission. For example, if an optics backplane assembly requires service or testing, a spare backplane module may be fitted to the host chassis so that it is not out-of-service while it's backplane assembly is being serviced. The fiber connections may be simply removed and re-routed as well enabling quick re-assignment of communication paths for card-to-card communication.

The present invention may be adapted to routers of same or different manufacture. There are many possible embodiments for providing specific and optimal backplane schemes. The method and apparatus of the present invention should be afforded the broadest scope under examination. The spirit and scope of the present invention is limited only by the language of the claims, which follow.

What is claimed is:

1. A backplane assembly comprising:
a first portion mounting a first signal interface configured to engage a corresponding signal interface of a first set of components in a chassis;
a second portion mounting a second signal interface configured to engage a corresponding signal interface of a second set of components in the same chassis;
a third portion mounting a third signal interface connected to one or both of the first and second signal interfaces placed on the backplane assembly to be accessible with the backplane assembly mounted to the chassis;
an adjustment mechanism allowing relative movement between the first and second portions; and
a signal conductor assembly engaging the first and second signal interfaces to communicate signals between the first set of components and the second set of components;
characterized in that placement of the third signal interface facilitates connection of the backplane assembly to a second backplane assembly having a third signal interface and assembled to a second chassis, thereby providing signal communication between components in the first chassis and the second chassis.

2. The backplane assembly of claim 1 wherein the first and second sets of components are router cards housed in a data packed router chassis.

3. The backplane assembly of claim 1 wherein the corresponding interfaces are groups of connectors for connecting signal conductors to individual ones of the cards in the first and second sets of router cards.

4. The backplane assembly of claim 1 wherein the corresponding interfaces are connectors to printed circuit boards (PCBs) that are in turn connected to the first and second set of components.

5. The backplane assembly of claim 4 wherein the signal conductor assembly comprises a cable of electrical conductors having end-connectors to engage the electrical connectors at the PCBs.

6. The backplane assembly of claim 1 wherein first and second signal interfaces comprise fiber-optic connectors, and the signal conductor assembly comprises one or more fiber-optic fibers having end-connectors for engaging the fiber-optic connectors.

7. The backplane assembly of claim 6 wherein the one or more fibers comprise one or more bundles, ribbons or cables.

8. The backplane assembly of claim 1 wherein the first and second signal interfaces comprise electrical connectors, and the signal conductor assembly comprises one or more cables of electrical conductors having end connectors to engage the electrical connectors.

9. The backplane assembly of claim 1 wherein the mechanism comprises telescopic engagement elements allowing adjustment of separation between the first and second portions.

10. The backplane assembly of claim 9 wherein the mechanism further comprises a mechanism for securing the telescoping first and second portions after adjustment to engage the corresponding interfaces of the first and second sets of components.

11. The backplane assembly of claim 1 wherein the mechanism further comprises first locating elements in the immediate area of each of the corresponding signal interfaces, and compatible locating elements in the immediate area of the first and second signal interfaces, to physically locate the first and second portions in assembly to the cabinet to engage the first and second interfaces with their corresponding interfaces of the first and second sets of components.

12. The backplane assembly of claim 11 wherein the locating elements comprise male and female elements for constraining engagement position.

13. The backplane assembly of claim 1 wherein the third signal interface is a connector for connecting one or more signal conductors.

14. The backplane assembly of claim 1 wherein the third signal interface comprises a fiber-optic connector compatible with a mating connector for one or more fiber-optic fibers between the backplane assemblies.

15. The backplane assembly of claim 14 wherein the fiber-optic fibers comprise one or more ribbons or cables.

16. The backplane assembly of claim 1 wherein the third signal interface is an electrical connector compatible with a mating connector of an electrical cable between the backplane assemblies.

17. A method for connecting a first signal interface to a corresponding signal interface connected to a first set of components and a second signal interface to a corresponding signal interface connected to a second set of components in a first chassis, and a third signal interface to a corresponding signal interface connected to a third set of components in a second chassis, comprising the steps of:
(a) preparing a backplane assembly comprising a first portion mounting a first signal interface configured to engage a corresponding signal interface of the first set of components, a second portion mounting a second signal interface configured to engage a corresponding signal interface of the second set of components, a third portion mounting a third signal interface connected to one or both of the first and second signal interfaces placed on the backplane assembly to be accessible with the backplane assembly mounted to the chassis, a mechanism allowing relative movement between the first and second portions, and a signal conductor assembly engaging the first and second signal interfaces to communicate signals between the first set of components and the second set of components; and
(b) assembling the modular backplane assembly to the cabinet, with the first signal interface engaging the corresponding interface of the first set of components, and the second signal interface engaging the corresponding interface of the second set of components, the mechanism allowing the first and second signal interfaces to assume a proper separation distance to accomplish engagement of each of the corresponding signal interfaces;
wherein placement of the third signal interface facilitates connection of the backplane assembly to a second backplane assembly having a third signal interface and assembled to a second chassis, thereby providing signal communication between components in the first chassis and the second chassis.

18. The method of claim 17 wherein the cabinet houses elements of a packet router and the first and second sets of components are router cards.

19. The method of claim 17 wherein the corresponding interfaces are groups of connectors for connecting signal conductors to individual ones of the cards in the first and second sets of router cards.

20. The method of claim 17 wherein the corresponding interfaces are connectors to printed circuit boards (PCBs) that are in turn connected to the first and second set of components.

21. The method of claim 20 wherein the signal conductor assembly comprises a cable of electrical conductors having end-connectors to engage the electrical connectors at the PCBs.

22. The method of claim 17 wherein the first and second signal interfaces comprise fiber-optic connectors and the signal conductor assembly comprises one or more fiber-optic fibers having end-connectors for engaging the fiber-optic connectors.

23. The method of claim 22 wherein the one or more fibers comprise one or more bundles, ribbons or cables.

24. The method of claim 17 wherein the first and second signal interfaces comprise electrical connectors and the signal conductor assembly comprises one or more cables of electrical conductors having end connectors to engage the electrical connectors.

25. The method of claim 17 wherein the mechanism comprises telescopic engagement elements allowing adjustment of separation between the first and second portions.

26. The method of claim 25 wherein the mechanism further comprises a mechanism for securing the telescoping first and second portions after adjustment to engage the corresponding interfaces of the first and second sets of components.

27. The method of claim 17 wherein the mechanism further comprises first locating elements in the immediate area of each of the corresponding signal interfaces, and compatible locating elements in the immediate area of the first and second signal interfaces, to physically locate the first and second portions in assembly to the cabinet to engage the first and second interfaces with their corresponding interfaces of the first and second sets of components.

28. The method of claim 27 wherein the locating elements comprise male and female elements for constraining engagement position.

29. The method of claim 17 wherein the third signal interface is a connector for connecting one or more signal conductors.

30. The method of claim 17 wherein the third signal interface comprises a fiber-optic connector compatible with a mating connector for one or more fiber-optic fibers between the backplane assemblies.

31. The method of claim 30 wherein the fiber-optic fibers comprise one or more ribbons or cables.

32. The method of claim 17 wherein the third signal interface is an electrical connector compatible with a mating connector of an electrical cable between the backplane assemblies.

* * * * *